United States Patent [19]

Kuxdorf et al.

[11] 4,032,410
[45] June 28, 1977

[54] DISTILLING COLUMN

[75] Inventors: Bernhard Kuxdorf, Bruhl; Herbert Püsche, Erftstadt; Heinz Erpenbach, Surth; Wernfried Riechmann, Bruhl-Vochem, all of Germany

[73] Assignee: Hoechst Aktiengesellschaft, Frankfurt am Main, Germany

[22] Filed: Apr. 20, 1976

[21] Appl. No.: 678,651

[30] Foreign Application Priority Data

Apr. 26, 1975 Germany .......................... 2518661

[52] U.S. Cl. .......................... 202/158; 261/114 TC
[51] Int. Cl.² .......................................... B01D 3/20
[58] Field of Search ............. 202/158; 261/114 TC; 196/100, 105, 139; 165/159, 110

[56] References Cited

UNITED STATES PATENTS

| | | | |
|---|---|---|---|
| 1,857,394 | 5/1932 | Olsen | 196/139 |
| 2,979,135 | 4/1961 | Eckert | 202/158 |
| 3,233,708 | 2/1966 | Glitsch | 261/114 TC |
| 3,262,684 | 7/1966 | Smith | 202/158 |
| 3,273,872 | 9/1966 | Eckert | 202/158 |
| 3,293,149 | 12/1966 | Lengemann | 202/158 |
| 3,364,124 | 1/1968 | Walker | 202/158 |
| 3,814,397 | 6/1974 | Geist | 202/158 |

FOREIGN PATENTS OR APPLICATIONS

| | | | |
|---|---|---|---|
| 463,428 | 2/1950 | Canada | 202/158 |
| 862,598 | 1/1953 | Germany | 202/158 |
| 972,015 | 10/1964 | United Kingdom | 202/158 |

*Primary Examiner*—Hiram H. Bernstein
*Attorney, Agent, or Firm*—Connolly and Hutz

[57] ABSTRACT

A distillation column comprising a shell which has serially arranged therein a plurality of distilling trays with respective liquid inlets and outlets. An annular slit of substantially uniform width is left between the individual trays and the shell. The slit may be interrupted by a plurality of spacers which bear against the inner surface of the shell, and the spacers are provided around the periphery of the individual trays.

3 Claims, 2 Drawing Figures

DISTILLING COLUMN

The present invention relates to a distilling column comprising a shell which has serially arranged therein, i.e. arranged one downstream of another, a plurality of distilling trays with respective liquid inlets and outlets.

Various types of distilling trays, including bubble trays, tunnel trays, valved trays and perforated trays, have already been described. A feature common to all those types of trays is that an interchange of constituents occurs between liquid layers on the trays and vapour ascending within the column from one tray to another. In the event of solid matter (which may for example result from decomposition, polycondensation or polymerization reactions under the influence of heat) being carried along by the material undergoing distillation, the trays just described are very likely to become fouled with such solid matter depositing predominantly at those places on the trays which are insufficiently washed over by the respective liquid.

The same is true of the so-called dead spaces (these being spaces which are involved insufficiently, if at all, in the brisk exchange of constituents which is typical of distilling trays), e.g. the narrow spaces left between wedged or bolted joints or between surfaces which are required to be sealed (cf. German Patent Specification No. 1542242).

Attempts have been made (cf. German Patent Specification ("Auslegeschrift") No. 2027655) to reduce the formation of polymers on the column wall and the lower surfaces of the distilling trays by the use of a distilling column having apertured trays but no liquid overflow. As proposed therein, the apertures near the periphery of the trays, i.e. those which are close to the wall of the column, should have a diameter larger than the apertures more remote from the column wall. In the trays just described, the liquid invariably takes the same route as vapour ascending through the apertures in the trays, so that it is possible for the trays under surfaces and also the column wall to become well wetted with liquid as a result of the soaking effect produced, but even so the fact remains that the trays in question are not adequately effective.

It is an object of the present invention, therefore, to provide a distilling column with particularly efficient trays, which will effectively inhibit the deposition of solid matter during distillation.

According to the present invention, a distillation column comprises a shell which has serially arranged therein a plurality of distilling trays with respective liquid inlets and outlets, an uninterrupted or interrupted annular slit of substantially uniform width being left between the individual trays and the shell.

Preferred features of the present invention, which can be used singly or (where appropriate) in combination, provide:

a. for the slit to be interrupted by a plurality of spacers which bear against the inner surface of the shell, the spacers being provided around the periphery of the individual trays;

b. for the individual spacers of feature (a) to be spaced from each other at equal angular separations;

c. for four spacers as specified in (a) or (b) to be provided around the periphery of each of the trays;

d. for the individual distilling trays to have an aligning rod passed centrally therethrough;

e. for the portion of the rod specified in (d) between each pair of adjacent trays to be concentrically surrounded by a sleeve;

f. for each sleeve specified in (e) to have a flanged upper end portion;

g. for a central insert provided with substantially diametrically opposite apertures to be disposed on each of the individual trays so as to surround the liquid inlet and the liquid outlet;

h. for the interior of each insert specified in (g) to be divided into two sections by a separator placed therein between the liquid inlet and the liquid outlet; and i. for each separator specified in (h) to be placed asymmetrically in the respective insert.

The distilling column of the present invention can readily be (and preferably is) dimensioned so as to permit a preponderant proportion of liquid to travel downwardly through the liquid outlets of the trays, only a minor proportion of liquid travelling downwardly through the annular slit, in contact with the inner surface of the shell; the present column enables the trays to be operated with an efficiency higher by 20–30% than in the case of the above-mentioned known distilling column, the degree of improvement obtainable in any particular case depending upon the load assigned to the column, provided that in any case the tolerance accepted for the width of the annular slit is not unduly large.

The only apertures which need be provided in the trays of the distilling column of the present invention comprise central apertures for receiving an aligning rod passed centrally therethrough as mentioned in (d) above, and eccentrically disposed apertures serving as liquid outlets. Thus there need be no serious danger of the trays being fouled by solid matter such as may be formed (e.g.) during the distillation of temperature-sensitive substances. Upstream (with respect to the ascending vapour) of the spacers provided according to preferred feature (a) above, around the periphery of the individual trays, there may indeed be a slightly reduced pressure, but liquid is so effectively circulated around these spacers that the deposition of solid matter thereon is definitely inhibited.

The central insert employed according to preferred feature (g) above causes the liquid to flow in two distinct streams (of a width depending upon the external diameter of the insert and the internal diameter of the shell) around the periphery of the respective tray, and thereby enables it to be intimately contacted with the ascending vapour, which ensures a good interchange of constituents.

Liquid arriving upon a given tray can be effectively prevented from becoming mixed with liquid which is about to leave that tray by means of the separator which according to preferred feature (h) above is placed between the liquid inlet and the liquid outlet.

One embodiment of the present invention will now be described with reference to the accompanying diagrammatic drawings, in which.

Figure 1:
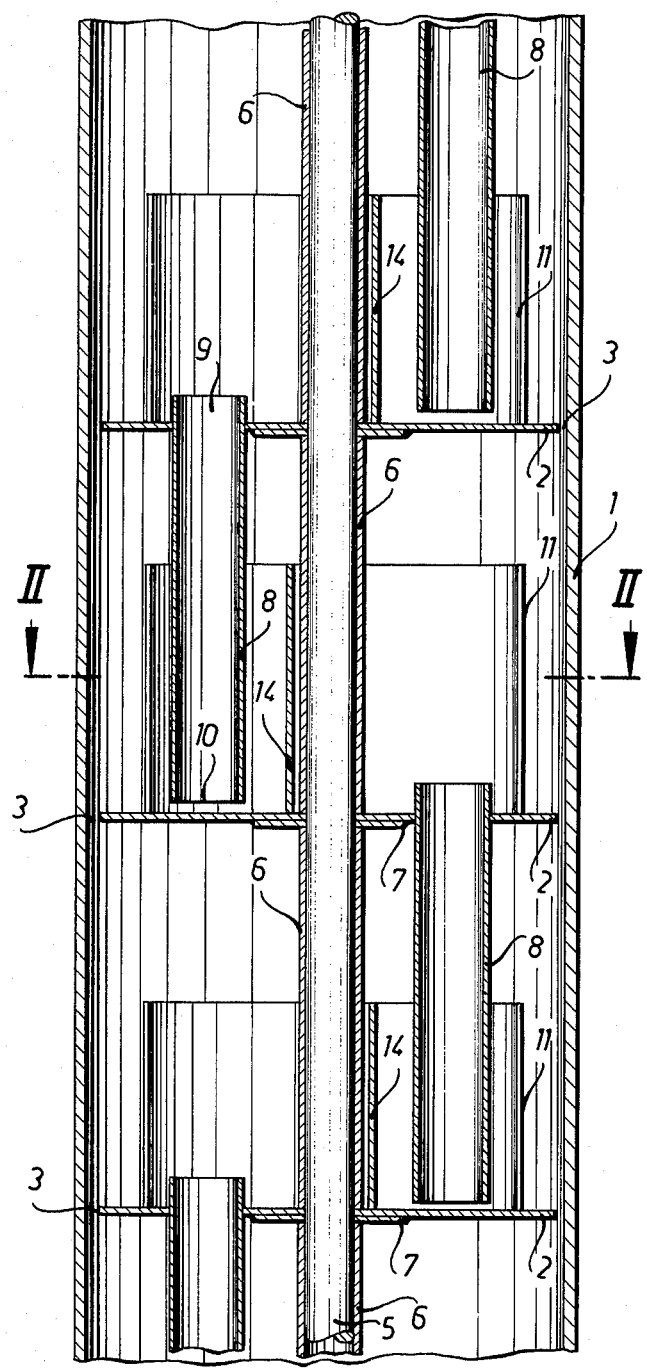
FIG. 1 is a vertical sectional view of a distilling column.
Figure 2:
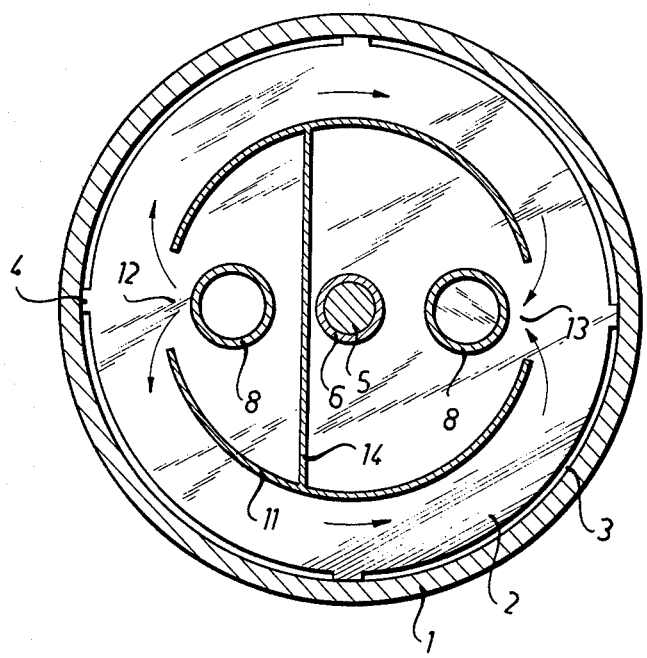
FIG. 2 is a cross-sectional view of the column of FIG. 1, taken on the line II—II in FIG. 1.

As can be seen, the column shown in the drawings comprises a shell 1 which has a plurality of distilling trays 2 serially disposed therein, e.g. with one tray upstream of another. A uniformly wide annular slit 3 is left between each tray 2 and the shell 1, except where, distributed around the periphery of each tray 2, there are spacers 4, which bear against the inner surface of the shell 1. The individual trays 2 all have an aligning rod 5 centrally passed therethrough, the portion of the rod 5 between each pair of adjacent trays being concentrically surrounded by a sleeve 6. The upper end portion of each sleeve 6 terminates in a flange 7, which provides support for the adjacent tray 2 situated above it, and the lower end of each sleeve 6 bears against the adjacent tray 2 situated below it. Each of the individual trays 2 also has eccentrically passed through it a tube 8. Liquid runs down from the upper end 9 of each tube 8 to the lower end 10 thereof, and is thus delivered to the next tray 2 below the respective tube 8. It is generally advantageous (or at least appropriate) for the spacing between the upper end 9 of each tube 8 and the respective tray 2 to be made larger than the spacing between the lower end 10 of the tube 8 and the next tray 2 below it. Disposed on each of the individual trays 2 is a central insert 11 provided with two diametrically opposite apertures 12,13, which is arranged so as to surround the liquid inlet and the liquid outlet; the apertures 12 and 13 enable the liquid to flow in two separate streams around the periphery of the respective tray 2 (cf. the three pairs of arrows in FIG. 2). The interior of each insert 11 is divided into two sections by a separator 14 placed asymmetrically therein between the liquid inlet and the liquid outlet.

The distilling column of the present invention has no packing placed between the column shell and the various distilling trays, and is therefore particularly suitable for use in the treatment of substances which are susceptible to polymerization, and also the treatment of reactive or corrosive materials, e.g. acrylic acid.

We claim:

1. A distillation column comprising a vertical elongated housing, said housing having a plurality of serially arranged distilling trays vertically spaced apart from each other therein, said plurality of trays being free of attachments to the inner wall of said housing forming an annular slit between said inner wall and said trays, said plurality of trays being centrally traversed by an aligning rod, said rod being concentrically surrounded by a sleeve between each pair of adjacent trays, each of said trays having a downpipe eccentrically passed therethrough forming a liquid outlet of the accompanying tray and a liquid inlet of the next following tray; distillation column wherein said trays are provided around their peripheries with a plurality of spacers spaced from each other at equal distances around the peripheries of said trays, said spacers bearing against the inner wall of said housing forming said annular slit substantially uniform in width and being interrupted by said spacers; an annular insert arranged concentrically to said rod is secured to each of said trays so as to form a chamber surrounding the liquid inlet and the liquid outlet of the respective tray, said insert having a first aperture in the range of said liquid inlet and a second aperture in the range of said liquid outlet; and a partition plate is asymmetrically secured to the insert dividing said chamber into a first compartment containing the liquid inlet and a second compartment containing the liquid outlet and the aligning rod, whereby the liquid conveyed to each of said trays is forced to flow from the liquid inlet compartment through the first aperture between said insert and the inner wall of said housing thereby to come in contact with vapor matter ascending through said slit, and then through the second aperture into the second compartment to run off via said downpipe.

2. The column as claimed in claim 1, wherein four spacers are provided around the periphery of each of the trays.

3. The column as claimed in claim 1, wherein each sleeve has a flanged upper end portion.

* * * * *